(12) United States Patent
Carretta et al.

(10) Patent No.: US 11,810,082 B2
(45) Date of Patent: *Nov. 7, 2023

(54) AUTOMATIC SAVINGS PROGRAM

(71) Applicant: Bank of America Corporation, Charlotte, NC (US)

(72) Inventors: Daniel A. Carretta, Clover, SC (US); Thomas M. Hancock, Charlotte, NC (US); Karen K. Lewy, Westlake Village, CA (US); Charles R. Liu, Charlotte, NC (US); Jack Meyers, Clayton, NC (US); Sheryl W. Strott, Clover, SC (US); Faith A. Tucker, Wichita, KS (US); Carrie A. Hanson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/983,088

(22) Filed: Nov. 8, 2022

(65) Prior Publication Data

US 2023/0068406 A1 Mar. 2, 2023

Related U.S. Application Data

(63) Continuation of application No. 16/817,785, filed on Mar. 13, 2020, now Pat. No. 11,526,856, which is a
(Continued)

(51) Int. Cl.
*G06Q 20/00* (2012.01)
*G06Q 20/10* (2012.01)
(Continued)

(52) U.S. Cl.
CPC .............. *G06Q 20/10* (2013.01); *G06Q 20/40* (2013.01); *G06Q 40/02* (2013.01); *G06Q 40/03* (2023.01)

(58) Field of Classification Search
CPC ......... G06Q 20/3224; G06Q 10/06314; G06Q 10/109; G06Q 10/1095; G06Q 20/40
(Continued)

(56) References Cited

U.S. PATENT DOCUMENTS

| 4,750,119 A | 6/1988 | Cohen et al. |
| 4,823,264 A | 4/1989 | Deming |

(Continued)

FOREIGN PATENT DOCUMENTS

| JP | 200350916 | 2/2003 |
| WO | 9314476 A1 | 7/1993 |

(Continued)

OTHER PUBLICATIONS

Text of First Office Action, PCT Application No. 20078005099965, Undated, 3 pages.
(Continued)

*Primary Examiner* — Hai Tran
(74) *Attorney, Agent, or Firm* — Banner & Witcoff, Ltd.

(57) ABSTRACT

A computer implemented method of processing a financial transaction executed by first person includes determining an automatic savings amount from the financial transaction by rounding up the amount of the financial transaction to the nearest dollar. The method further includes debiting the calculated savings amount from an account of the first person and crediting the savings amount to an account of a second person.

17 Claims, 5 Drawing Sheets

Related U.S. Application Data continuation of application No. 14/109,269, filed on Dec. 17, 2013, now Pat. No. 10,628,808, which is a continuation of application No. 13/613,433, filed on Sep. 13, 2012, now Pat. No. 8,635,137, which is a continuation of application No. 12/554,395, filed on Sep. 4, 2009, now Pat. No. 8,301,530, which is a continuation of application No. 11/161,418, filed on Aug. 2, 2005, now abandoned.

(51) Int. Cl.
*G06Q 20/40* (2012.01)
*G06Q 40/02* (2023.01)
*G06Q 40/03* (2023.01)

(58) Field of Classification Search
USPC .......................................................... 705/39
See application file for complete search history.

(56) References Cited

U.S. PATENT DOCUMENTS

| | | | |
|---|---|---|---|
| 4,941,090 A | 7/1990 | McCarthy | |
| 5,056,019 A | 10/1991 | Schultz et al. | |
| 5,200,889 A | 4/1993 | Mori | |
| 5,287,268 A | 2/1994 | McCarthy | |
| 5,302,811 A | 4/1994 | Fukatsu | |
| 5,466,919 A | 11/1995 | Hovakimian | |
| 5,471,669 A | 11/1995 | Lidman | |
| 5,621,640 A | 4/1997 | Burke | |
| 5,787,404 A | 7/1998 | Fernandez-Holmann | |
| 5,970,480 A | 10/1999 | Kalina | |
| 5,987,429 A | 11/1999 | Maritzen et al. | |
| 6,036,344 A | 3/2000 | Goldenberg | |
| 6,049,778 A | 4/2000 | Walker et al. | |
| 6,088,682 A | 7/2000 | Burke | |
| 6,112,191 A * | 8/2000 | Burke | G06Q 20/18 705/17 |
| 6,119,099 A | 9/2000 | Walker et al. | |
| 6,164,533 A | 12/2000 | Barton | |
| 6,267,670 B1 | 7/2001 | Walker et al. | |
| 6,298,329 B1 | 10/2001 | Walker et al. | |
| 6,381,590 B1 | 4/2002 | Debois | |
| 6,581,041 B1 | 6/2003 | Canney | |
| 6,598,024 B1 | 7/2003 | Walker et al. | |
| 6,631,358 B1 | 10/2003 | Ogilvie | |
| 6,965,868 B1 | 11/2005 | Bednarek | |
| 7,072,851 B1 | 7/2006 | Wilcox et al. | |
| 7,090,138 B2 | 8/2006 | Rettenmyer et al. | |
| 7,392,224 B1 | 6/2008 | Bauer et al. | |
| 7,398,226 B2 | 7/2008 | Haines et al. | |
| 7,597,255 B2 | 10/2009 | Deane et al. | |
| 7,725,387 B1 | 5/2010 | Fitch et al. | |
| 7,753,261 B2 | 7/2010 | Rosenblatt et al. | |
| 7,797,208 B2 | 9/2010 | Thomas | |
| 8,301,530 B2 | 10/2012 | Carretta et al. | |
| 8,401,936 B2 | 3/2013 | Penning et al. | |
| 8,407,137 B2 | 3/2013 | Thomas | |
| 8,416,924 B1 | 4/2013 | Barth et al. | |
| 8,635,137 B2 | 1/2014 | Carretta et al. | |
| 8,738,429 B2 | 5/2014 | Shepard | |
| 9,495,703 B1 | 11/2016 | Kaye, III | |
| 9,734,536 B2 | 8/2017 | Cruttenden et al. | |
| 2002/0046124 A1 | 4/2002 | Alderucci et al. | |
| 2002/0120513 A1 | 8/2002 | Webb et al. | |
| 2002/0161630 A1 | 10/2002 | Kern et al. | |
| 2002/0188533 A1 | 12/2002 | Sanchez et al. | |
| 2003/0009379 A1 | 1/2003 | Narasimhan et al. | |
| 2003/0061097 A1 | 3/2003 | Walker et al. | |
| 2003/0064788 A1 * | 4/2003 | Walker | G07F 17/32 463/20 |
| 2003/0101131 A1 | 5/2003 | Warren et al. | |
| 2003/0149629 A1 | 8/2003 | Claridge et al. | |
| 2003/0200163 A1 * | 10/2003 | O'Riordan | G06Q 40/02 705/35 |
| 2003/0208439 A1 * | 11/2003 | Rast | G06Q 20/403 705/38 |
| 2003/0233317 A1 | 12/2003 | Judd | |
| 2003/0236712 A1 | 12/2003 | Antonucci et al. | |
| 2004/0039645 A1 | 2/2004 | Walker et al. | |
| 2004/0054593 A1 | 3/2004 | Van Luchen | |
| 2004/0122736 A1 | 6/2004 | Strock et al. | |
| 2004/0153400 A1 | 8/2004 | Burke | |
| 2004/0193497 A1 | 9/2004 | Tanaka | |
| 2004/0222285 A1 | 11/2004 | Pohl | |
| 2005/0004867 A1 | 1/2005 | Spector | |
| 2005/0021353 A1 | 1/2005 | Aviles et al. | |
| 2005/0021363 A1 | 1/2005 | Stimson et al. | |
| 2005/0096981 A1 | 5/2005 | Shimada | |
| 2005/0097034 A1 | 5/2005 | Loeger et al. | |
| 2005/0133590 A1 | 6/2005 | Rettenmyer et al. | |
| 2005/0222951 A1 | 10/2005 | Sherman | |
| 2005/0251440 A1 | 11/2005 | Bednarek | |
| 2006/0047589 A1 | 3/2006 | Grau | |
| 2006/0212357 A1 | 9/2006 | White et al. | |
| 2007/0033134 A1 | 2/2007 | Carretta et al. | |
| 2007/0071197 A1 | 3/2007 | Ryoo | |
| 2007/0080213 A1 | 4/2007 | Workman et al. | |
| 2007/0094130 A1 | 4/2007 | Burke | |
| 2007/0124203 A1 | 5/2007 | Popescu et al. | |
| 2007/0174166 A1 | 7/2007 | Jones | |
| 2007/0294166 A1 | 12/2007 | Cello | |
| 2008/0089111 A1 | 4/2008 | Lee et al. | |
| 2008/0103968 A1 | 5/2008 | Bies et al. | |
| 2009/0063332 A1 | 3/2009 | Tabaczynski et al. | |
| 2009/0222358 A1 | 9/2009 | Bednarek | |
| 2010/0076776 A1 | 3/2010 | Kopko et al. | |
| 2011/0004546 A1 | 1/2011 | Thomas | |
| 2012/0072345 A1 | 3/2012 | Solomon et al. | |
| 2012/0197794 A1 | 8/2012 | Grigg et al. | |
| 2013/0030992 A1 | 1/2013 | Carretta et al. | |
| 2013/0231994 A1 | 9/2013 | Antonucci | |
| 2014/0006275 A1 | 1/2014 | Hanson et al. | |
| 2014/0012691 A1 | 1/2014 | Hanson et al. | |
| 2014/0222636 A1 | 8/2014 | Cheng et al. | |
| 2014/0337150 A1 | 11/2014 | Anand | |
| 2015/0081458 A1 | 3/2015 | Cruttenden et al. | |
| 2015/0193866 A1 | 7/2015 | Van Heerden et al. | |
| 2015/0193867 A1 | 7/2015 | Del Vecchio et al. | |
| 2015/0230045 A1 | 8/2015 | Johnson et al. | |
| 2016/0042340 A1 | 2/2016 | Burke et al. | |
| 2016/0321663 A1 | 11/2016 | Batlle | |

FOREIGN PATENT DOCUMENTS

| | | |
|---|---|---|
| WO | 03030054 A1 | 4/2003 |
| WO | 2007016697 A2 | 2/2007 |
| WO | 2008111965 A2 | 9/2008 |

OTHER PUBLICATIONS

Wachovia Introduces New Product That Makes Saving Easy and Automatic for Consumers, http://www.wachovia.com/> inside/page/printer/0,,134_307% E1701.00.html, 3 pages, dated Jan. 11, 2008.

Wachovia offers customers Way2Save, <http://www.charlotte.com/businessA/-print/story/441323.html>, 1 page, downloaded Jan. 11, 2008.

Wachovia offers new savings incentive that offers deposit match, <http://www.timesanddemocrat.com/>articles/2008/01/11 /business/doc478, 2 pages, downloaded Jan. 11, 2008.

Wachovia Personal Finance FAQs, Way2Save Account, http://111.wachovia.com/personal/page/printer/0J,657_2167% 5E12663, downloaded Mar. 11, 2008, 3 pages.

Wachovia Way2Save(SM) Account Agreement, http://www.wachovia.com/misc/0, 1756,00.html, 2 <http://www.wachovia.com/misc/0% ef%bc%8c,1756,00.html%ef%bc%8c2>, 3 pages, downloaded Jan. 18, 2008.

Wachovia's Way2Save Savings Account, with scans, <http://bankdesign.com/boardA12618.html>, 3 pages, downloaded Jan. 11, 2008.

Wachovia, My Arch-Nemesis Bank, Offers Very Tempting 5% Plus

(56) References Cited

OTHER PUBLICATIONS

Bonus Savings Account Deal, <http://www.punny>.org/money/wachovia-my-arch-nemesis-bank-offers-v, 7 pages, downloaded Jan. 11, 2008.
Way2save, Turn Everyday Banking Into Automatic Savings brochure, © 2008, Wachovia Corporation, 6 pages.
Who Says You Can't Afford to Save? Bank on it: Spare Change Can Add Up Fast (Third Edition), Jaffe, C.A., Mar. 5, 2000 © 2012 ProQuest LLC, 3 pages.
Wolfe, Daniel, "Wachovia Links Savings, Debit to Land Customers," American Banker, vol. 173?issue 9, Jan. 14, 2008, 3 pages.
Sep. 7, 2018—U.S. Office Action—U.S. Appl. No. 14/551,930.
May 14, 2019—U.S. Office Action—U.S. Appl. No. 14/551,930.
Dec. 2, 2019—U.S. Patent Board Decision—Examiner Reversed U.S. Appl. No. 14/109,269.
Dec. 15, 2021—U.S. Office Action—U.S. Appl. No. 16/817,785.
Google Scholar NPL (non-patent literature) Search Results, dated Dec. 11, 2021. (Year: 2021).
Aug. 2, 2005—(US)—Related U.S. Appl. No. 11/161,418.
Aug. 17, 2007 (WO) International Search Report, PCT/US 06/30362, 6 pages.
Feb. 6, 2007—(PCT)—Related Application No. PCT/US07/61694.
Feb. 8, 2008—(US)—Related U.S. Appl. No. 61/027,397.
Jan. 2008—Option1 Credit Union, OPTIONS News About Opportunity, 5 pages.
Feb. 9, 2009—(US)—Related U.S. Appl. No. 12/368,034.
Sep. 4, 2009—(US)—Related U.S. Appl. No. 12/554,616.
Jul. 30, 2010—Supplementary European Search Report, PCT/US2006030362, 5 pages.
Mar. 24, 2010—(US)—Related U.S. Appl. No. 12/730,394.
Aug. 8, 2011 (CN) Second Office Action, Application No. 200780050996.5, 6 pages.
Dec. 13, 2011 (EP)—Office Action—Application No. Patent No. 0689359.4-221/1915731,18 pages.
Jul. 14, 2011 (EP) Communication from European Patent Office, Application No. 06 789 359.4 0 2221, 5 pages.
Jun. 14, 2011—(PCT) Response to Office Action—Application PCT/US2006/030362, 11 pages.
Nov. 24, 2011—(PCT) Response to Office Action—PCT Application PCT/US2006/030362, 4 pages.
Apr. 27, 2012—U.S. File History—U.S. Appl. No. 11/161,418, filed Feb. 8, 2005.
Nov. 27, 2012—U.S. Non-Final Office Action—U.S. Appl. No. 13/613,433.
Sep. 7, 2012—U.S. File History for U.S. Appl. No. 12/554,616, filed Apr. 9, 2009.
Sep. 24, 2012—U.S. Notice of Allowance and Fee(s) Due, U.S. Appl. No. 12/554,935, 10 pages.
Sep. 7, 2012—U.S. File History for U.S. Appl. No. 12/368,034, filed Sep. 2, 2009.
Aug. 28, 2013—U.S. Advisory Action—U.S. Appl. No. 12/730,394.
Dec. 17, 2013—(US)—Related U.S. Appl. No. 14/109,269.
Apr. 5, 2017—U.S. Office Action—U.S. Appl. No. 14/109,269.
Dec. 20, 2017—U.S. Office Action—U.S. Appl. No. 14/844,884.
Mar. 27, 2017—U.S. Office Action—U.S. Appl. No. 14/551,930.
Nov. 27, 2017—U.S. Office Action—U.S. Appl. No. 14/850,593.
Apr. 23, 2018—U.S. Office Action—U.S. Appl. No. 14/844,880.
Jan. 8, 2018—U.S. Office Action—U.S. Appl. No. 14/844,880.
Jan. 10, 2018—U.S. Office Action—U.S. Appl. No. 14/844,896.
Jan. 18, 2018—U.S. Office Action—U.S. Appl. No. 14/844,875.
Jan. 18, 2018—U.S. Office Action—U.S. Appl. No. 14/844,887.
Jul. 27, 2018—U.S. Office Action—U.S. Appl. No. 14/844,896.
May 21, 2018—U.S. Office Action—U.S. Appl. No. 14/850,593.
Banco Popular Ahorro Directo, <http://www.popular.com/ahorrodirectto/index-en.html>, downloaded Mar. 11, 2008, 3 pages.
Bank of America offers a new way to save, dated Oct. 4, 2005, www.msnbc.msn.com/id/9593071/#.UL463-SCmSo, 2 pages.
Bank of America's Twist on Debit Card Rewards, dated Oct. 6, 2005, www.depositaccounts.com/blog/2005/10/bank-of-americas-twist-on-debit-card-html, 1 page.
Bank of America's Unusual Automated Savings Plan by Jim Bruene, dated Oct. 5, 2005, © 1995-2010, Financial Insite, Inc., 2 pages.
Bank the Rest® savings program, Spend and Save. Together at last, <http://www.scotiabank.com/BankTheRest>, downloaded Jan. 25, 2012, 1 page.
Best Bets Financial Services, Premier Bank, <http://www.connectmidmissouri.com/directory/financial/premium.aspx>?id=1761644, downloaded Jan. 25, 2012, 4 pages.
Electronic Payments Primer, National Electronic Commerce Coordinating Counsel, Oct. 2002, http://www85.homepage.villanova.edu/timothy.ay/MIS3030/epayments_primer.pdf, 40 pages.
*Every Penny Counts, Inc.* v. *Bank of America Corporation and Bank of America, N.A.*, Memorandum and Order, U.S. District Court, Middle District of Florida, Fort Meyers Division, Case No. 2:07-cv-042, dated May 27, 2009, 6 pages.
*Every Penny Counts, Inc.* v. *Bank of America Corporation and Bank of America, N.A.*; Opinion and Order; U.S. District Court, Middle District of Florida, Fort Meyers Division, Case No. 2:07-cv-04-FtM-29SPC, dated Sep. 29, 2008, 16 pages.
File History for U.S. Appl. No. 12/730,394, filed Mar. 24, 2010.
Finance, <http://www.fatwallet.com/t/52/799201/>, 11 pages, downloaded Jan. 11, 2008.
Fowler, G.A., These Apps Can Finally Get you to Save Money, <http://www.wsj.com/articles/these-apps-can-finally-get-you-to-save-money-1434477296?mod=djemptech_t>, printed Oct. 6, 2015; 5 pages.
Introducing Free Checking with Extra Savings on top, Savings just got a whole lot easier, Capital One Bank, Baton Rouge Advocate, Oct. 28, 2009, 1 page.
North Carolina Bank and Trust, Round Up to Save, https:/www.ncbtonline.com/productsandservices/personal/ <http://www.ncbtonline.com/productsandservices/personal/> rounduptosave.aspx, downloaded Jan. 25, 2012, 2 pages.
Option1 Credit Union Spare Change Debit Card Savings Program, <http://www.option1cu.org/about-bell-com/news.html>, downloaded Feb. 3, 2008, 2 pages.
Round It Up America®, Round up. Donate Change, Make a Difference, Support Round It Up America® today!, http://www.rounditupamerica.org/donate-online.php <http://www.rounditupamerica.org/donate-online.php>, downloaded Jan. 25, 2012, 2 pages.
Round It Up America®, Round up. Donate Change, Make a Difference. Recent News, <http://www/rounditupaemrica>.org, downloaded Jan. 25, 2012, 3 pages.
Round it Up America®, Round Up. Donate Change. Make a Difference, <http://www.rounditupamerica.org>, downloaded Nov. 8, 2010, 2 pages.

* cited by examiner

AUTOMATIC SAVINGS PROGRAM

RELATED APPLICATIONS

This application is a continuation of U.S. patent application Ser. No. 16/817,785, which is a continuation of U.S. patent application Ser. No. 14/109,269, filed Dec. 17, 2013, which is a continuation of U.S. patent application Ser. No. 13/613,433, filed Sep. 13, 2012 (now U.S. Pat. No. 8,635,137), which claims priority to U.S. patent application Ser. No. 12/554,395, filed Sep. 4, 2009 (now U.S. Pat. No. 8,301,530), which claims priority to U.S. application Ser. No. 11/161,418, filed Aug. 2, 2005, which was abandoned. All of the aforementioned are incorporated by reference in their entirety herein.

FIELD OF THE INVENTION

One embodiment of the present invention is directed to the computer processing of a consumer savings program. More particularly, one embodiment of the present invention is directed to the computer processing of a consumer savings program that provides for automatic savings during any transaction.

BACKGROUND INFORMATION

Many consumers feel that saving money is difficult. Those who make less than the median income level, or are raising families, or are new immigrants, find it particularly challenging to put money away for emergencies, a child's education, or a special purchase. Even affluent consumers who do have the means to save money often feel that they could save more.

Currently, a consumer can save funds in a bank account by making deposits into the account or by transferring funds from another account. Further, they can automate the savings function by setting up recurring transfers from another account. However, the recurring transfer function is limited by the requirement to set a specific and minimum transfer amount and the need for the transfer to occur on a particular schedule. The recurring transfer function does not adequately support the flexibility of daily or small amount transfers.

In addition, grandparents or other relatives or friends sometimes desire to contribute money to somebody else's (e.g., a grandchild's savings account. These contributors likely desire an automatic and pain free way to facilitate such a transfer of funds.

Based on the foregoing, there is a need for a system and method for automatically facilitating savings.

SUMMARY OF THE INVENTION

One embodiment of the present invention is a computer implemented method of processing a financial transaction executed by first person. The method includes determining an automatic savings amount from the financial transaction by rounding up the amount of the financial transaction to the nearest dollar. The method further includes debiting the calculated savings amount from an account of the first person and crediting the savings amount to an account of a second person.

DETAILED DESCRIPTION

One embodiment of the present invention is a computer implemented savings program in which each financial transaction by a customer of a bank or other financial institution automatically generates a savings amount which is deposited in the customer's or somebody else's savings account. Thus the customer can accumulate savings conveniently and painlessly.

Figure 1:
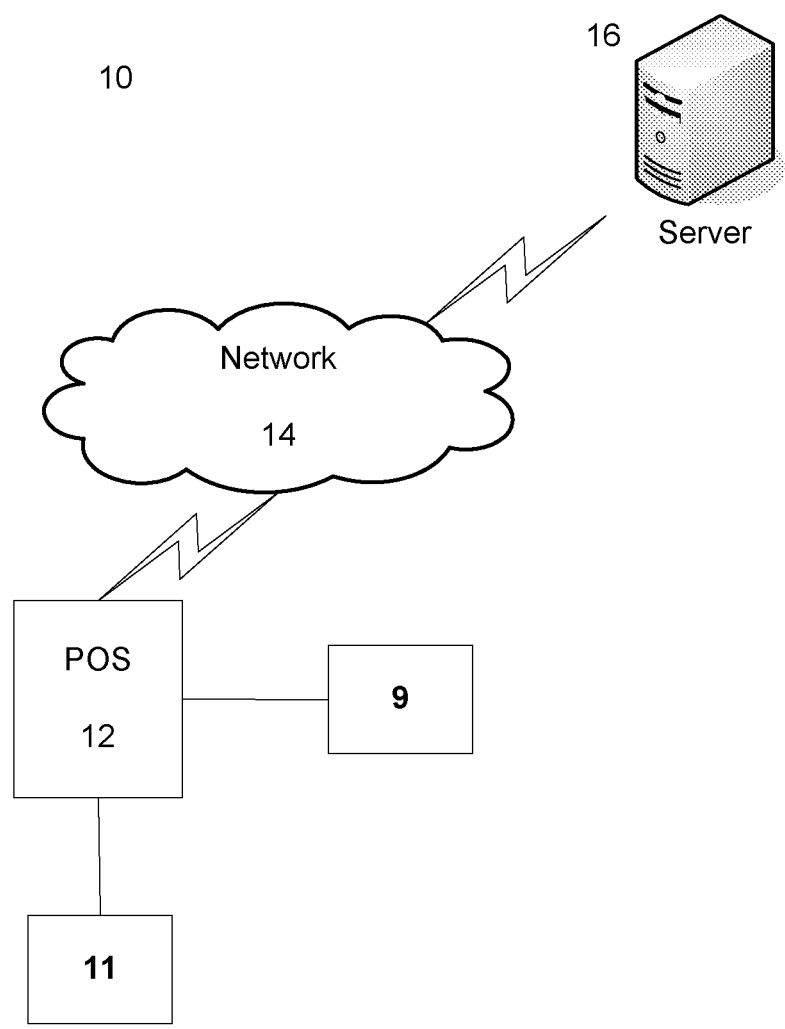
FIG. 1 is an overview diagram of a system in accordance with one embodiment of the present invention.

FIG. 1 is an overview diagram of a system 10 in accordance with one embodiment of the present invention. System 10 includes a point of sale device ("POS") 12 coupled to a computer server 16 via a network 14.

POS 12 is an electronic cash register that includes a barcode reader 9 that is used to read barcodes on products and to automatically enter the products and prices into POS 12. POS 12 further includes a card reader 11 that reads account information from a credit card, debit card, or any other type of financial device that can be used to purchase an item. POS 12 may include other devices, such as a keypad, that can also be used to read account information for facilitating a transaction. In one embodiment, POS 12 is located at a retailer.

Network 14 can be any type of network or communication device that allows POS 12 to communicate with server 16. Network 14 includes one or more routers or computer systems. In one embodiment, network 14 includes a computer system operated by the issuer of the credit card or debit card/check card used to make a purchase at POS 12 (e.g., a computer system operated by VISA).

Server 16 is a computer system operated by a bank or other financial institution that is implementing an embodiment of the present invention. Server 16 may be any type of computer or other device that is capable of communicating with network 14 and executing software steps. In one embodiment, server 16 includes a processor, memory and communication interface.

Figure 2:
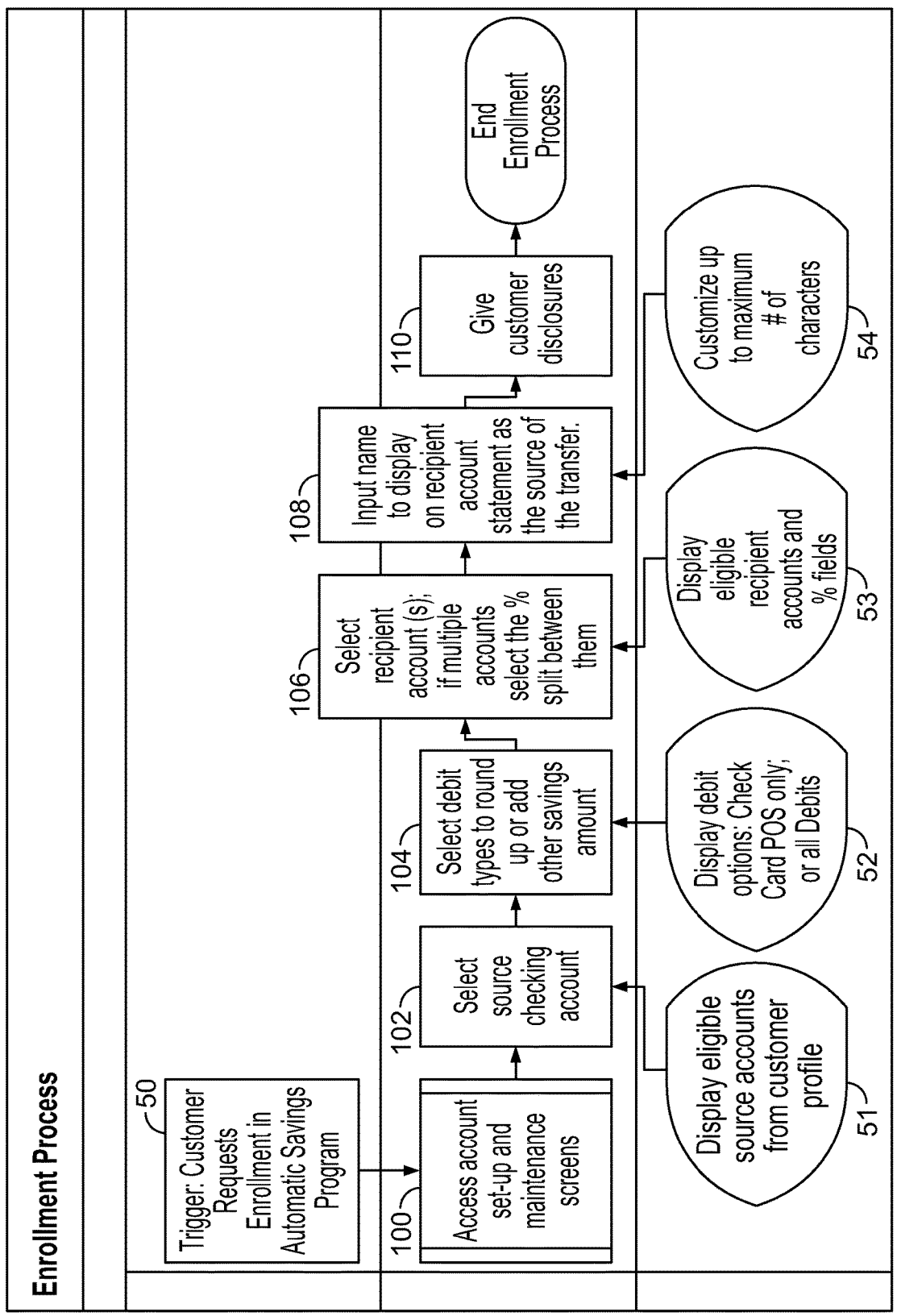
FIG. 2 is a flow diagram of the functionality performed by a server in accordance with one embodiment of the present invention in order to enroll a customer in the automatic savings program.

FIG. 2 is a flow diagram of the functionality performed by server 16 in accordance with one embodiment of the present invention in order to enroll a customer in the automatic savings program. In one embodiment, the functionality of FIG. 2, and FIG. 3-5 disclosed below, is implemented by software stored in memory and executed by a processor. In other embodiments, the functionality can be performed by hardware, or any combination of hardware and software.

100: Account set-up and maintenance screens/interfaces are accessed in response to a customer request to enroll in the automatic savings program (50). In one embodiment, the screens/interfaces are accessed by bank personnel at a terminal locally or remotely connected to server 16. In another embodiment, a user may access the screens/interfaces at a terminal remotely connected to server 16 through network 14.

102: The checking account that is the source of the automatic savings amount is selected. The eligible source accounts are displayed from the customer's profile. In other embodiments, another type of account instead of a checking account can be used, as long as the selected account is a source of funds.

104: The types of debits/transactions that are to be "round up" are selected. "Round up" refers to one method used to calculate a savings amount from a transaction. In one embodiment, the round up amount is an amount of excess funds produced by applying a rounder transaction to the amount of a transaction such as a credit/debit card charge at POS 12. If the rounder transaction rounds up to the nearest dollar, for example, a purchase made for $54.08 would generate a rounded amount of $0.92. Other embodiments of the present invention may round up to a predetermined amount besides the nearest dollar. Still further, other embodiments of the present invention may calculate the savings amount using a method other than round up. For example, a fixed percentage can be applied to each transaction to calculate a savings amount, or a fixed amount of money (e.g., $130) can be considered the savings amount. The available debits/transaction types to be round up are displayed (52) and can include only check card/debit card POS transactions, or any other types of debits. Example of other debits that can be the subject of round up or other calculation of a savings amount include paper checks, electronic bill pay, electronic checks, automatic payments and Automated Clearing House ("ACH") transfers.

106: The recipient account or accounts for the savings amount is selected based on the displayed eligible recipient accounts and % fields or the account number can be inputted. In one embodiment, possible recipient accounts include the customers own savings account, person to person transfer (e.g., a grandparents round ups being credited to a grandchild's savings account or 529 college savings plan), charities, investment accounts, etc. In general, any account that can accept transfers can be eligible for selection. If multiple recipient accounts are selected, the customer can choose a percentage distribution for each of the accounts, or another mechanism that can be used to divide the savings amount between the multiple accounts.

108: The name to display on the recipient's account statement as the source of the transfer is input.

The name may be customized to a maximum number of characters or may default to a pre-set description. For example the account statement might state "a Transfer From Grandma".

110: The customer is given disclosures that for example, describe the customer's selections and the legal ramifications of such selections.

An embodiment of the present invention also allows the customer to modify parameters or discontinue enrollment at any time remotely using an online banking feature or other remote computing technology.

Figure 3:
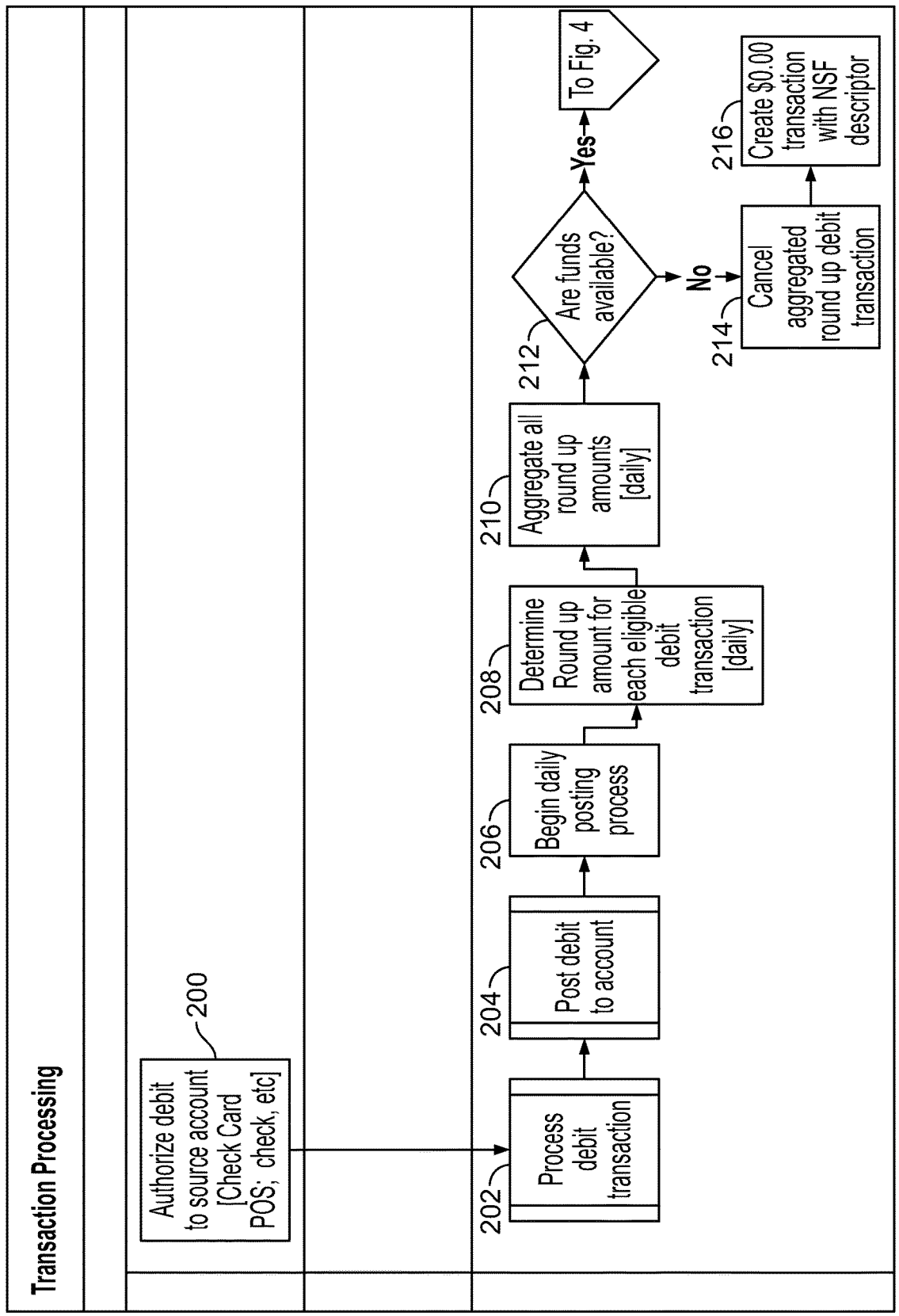
FIG. 3 is a flow diagram of the functionality performed by a server in accordance with one embodiment of the present invention to daily process the automatic savings transaction.

FIG. 3 is a flow diagram of the functionality performed by server 16 in accordance with one embodiment of the present invention to daily process the automatic savings transaction.

200: The debit to the source account (e.g., check card POS, check, etc.) selected at 102 is authorized.

202: The debit transaction, such as a purchase at POS 12 using a debit card, is processed.

204: The debit transaction is posted to the source account.

206: The daily posting transaction begins.

208: The round up amount (or other savings amount) for each eligible debit transaction is determined. This occurs on a daily basis.

210: All round up amounts are aggregated. This occurs on a daily basis. By aggregating the round ups for one daily posting, overdrafts to the source account can be avoided. In one embodiment, the daily posting occurs at the end of the day to further avoid overdrafts.

212: A determination is made if funds are available in the source account. If not, the aggregated round up debit transaction is cancelled (214) and a $0.00 transaction is created with a no funds in source account descriptor (216).

Figure 4:
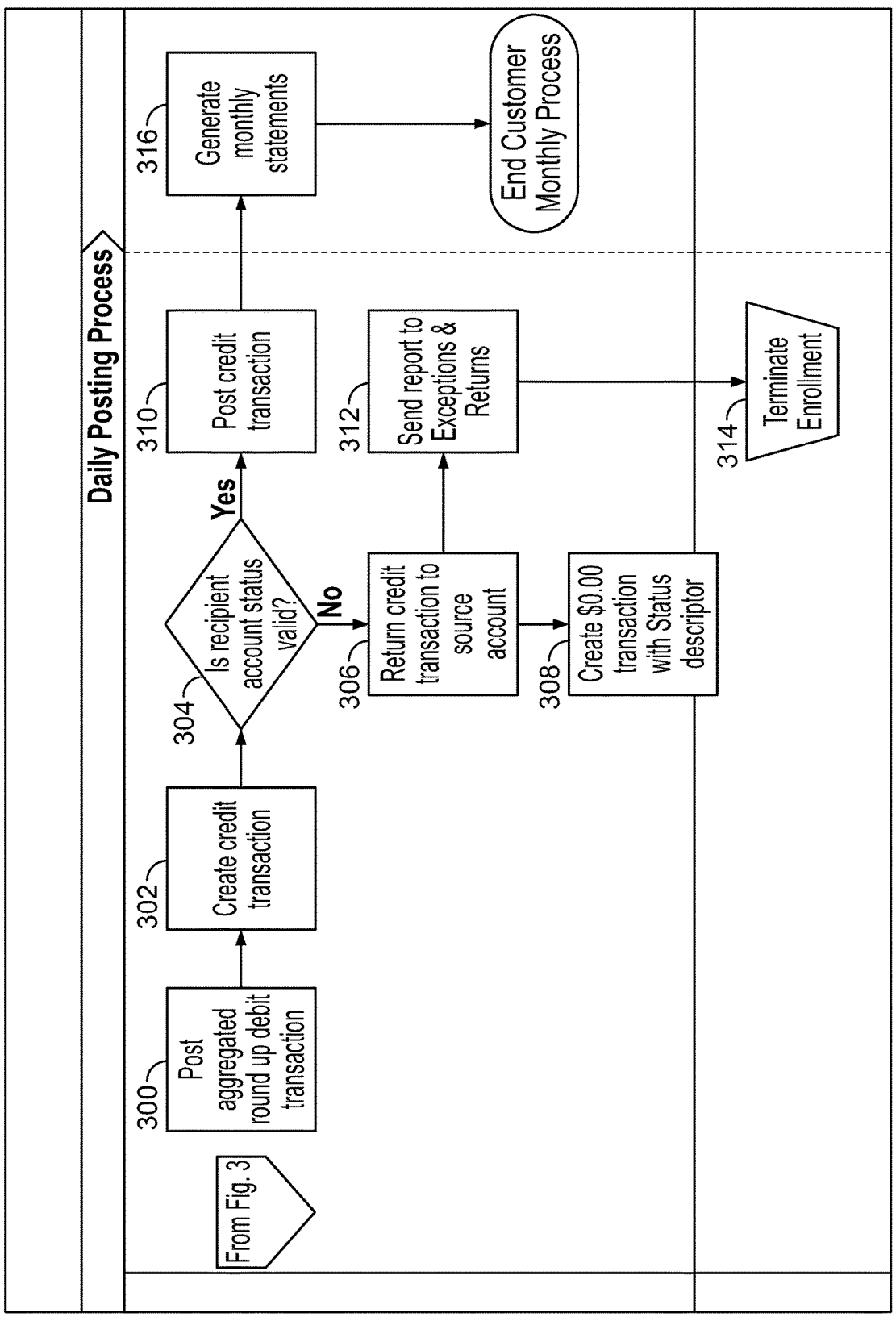
FIG. 4 is a flow diagram of the functionality performed by a server in accordance with one embodiment of the present invention to perform a daily posting of the automatic savings transaction.

FIG. 4 is a flow diagram of the functionality performed by server 16 in accordance with one embodiment of the present invention to perform a daily posting of the automatic savings transaction.

300: If funds are determined to be available at 212, the aggregated round up debit transaction is posted.

302: The credit transaction is created.

304: A determination is made if the recipient account(s) selected at 106 is valid. If it is valid, the credit transaction is posted (310).

306: If the recipient account(s) is not valid at 304, the credit transaction is returned to the source account and a $0.00 transaction is created with a status descriptor. A report of the invalid source account is sent to an "exceptions & returns" file and enrollment of the automatic savings account for that customer is terminated (312, 314).

316: Monthly statements are generated that include the automatic savings function. Both the source and recipient accounts may display a month-to-date and year-to-date summary of round up transfers on their statements.

Figure 5:
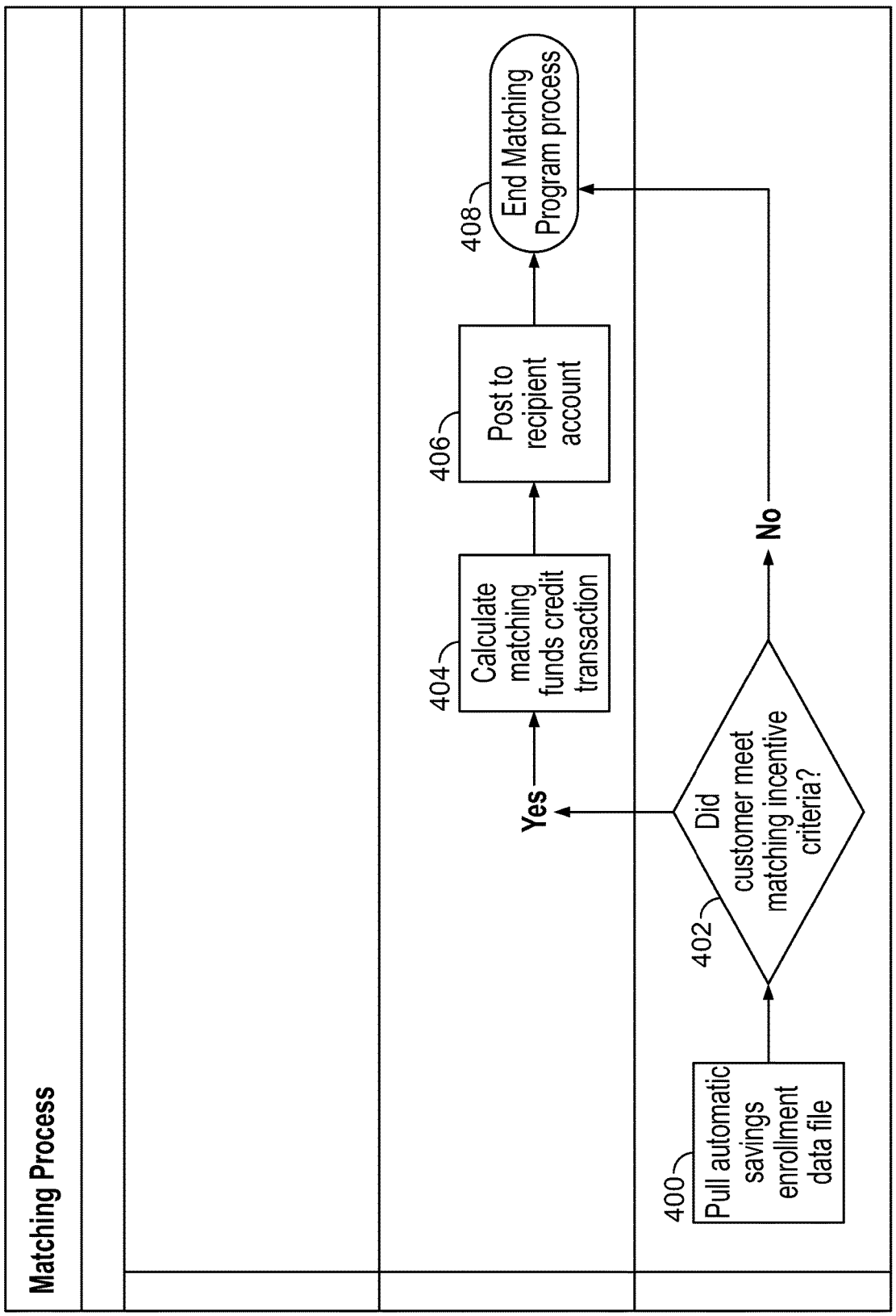
FIG. 5 is a flow diagram of the functionality performed by a server in accordance with one embodiment of the present invention to implement a matching process in conjunction with the automatic savings program.

FIG. 5 is a flow diagram of the functionality performed by server 16 in accordance with one embodiment of the present invention to implement a matching process in conjunction with the automatic savings program. A bank or other organization can implement the matching process in order to encourage more customers to enroll in the automatic savings program, or to encourage customers to modify their behavior for the benefit of the bank, such as to use their debit cards more often, use checks less, switch to electronic statements, use check safekeeping, etc. The bank can offer to match the round up or other savings amount for a fixed time period, a permanent time period, or other type of arrangement (e.g., every 10th transaction, $0.05 for every transaction, etc.).

400: During the daily posting process of FIG. 4, or at another point in the process (e.g., quarterly, annually, etc.), the customer data file for the automatic savings program is pulled. The data file stores all transactions eligible for matching and other data, such as the length of enrollment for the customer, that can be used to determine if the customer has met the matching incentive criteria.

402: It is determined if the customer met the matching incentive criteria. If not, the matching process is ended (408).

404: If the customer meets the matching incentive at 402, the matching funds credit transaction is calculated. The matching funds is then posted to the recipient account (406).

As disclosed, an automatic savings program in accordance to embodiments of the invention provides an easy and automatic method for a customer to save, and can encourage increased savings.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A system comprising:
   a checking account associated with a first person capable of executing financial transactions;
   a savings account associated with a second person;
   a communication interface adapted to receive financial transaction information from a point of sale device; and
   a computer server communicatively coupled over a communication network with the point of sale device, wherein the computer server comprises memory storing computer-executable instructions that, when executed by a processor of the computer server, perform steps comprising:
   (a) determining a savings amount based on at least a first financial transaction of the first person;
   (b) debiting the savings amount from the checking account of the first person; and
   (c) crediting at least a part of the savings amount to the savings account associated with a second person;
   (d) receiving at a financial institution, directly from the point of sale device communicating with the financial institution, information relating to a first base financial transaction associated with the checking account and relating to a transaction for at least one of goods and services between the first person and a merchant;
   (e) if the checking account has sufficient funds to cover the first base financial transaction, debiting the checking account by amount of the first base financial transaction;
   (f) receiving at the financial institution information relating to a second base financial transaction associated with the checking account;
   (g) if the checking account has sufficient funds to cover the second base financial transaction, debiting the checking account by amount of the second base financial transaction;
   (h) periodically calculating at the financial institution an aggregate savings amount based at least on the first and the second base financial transactions, wherein the periodically calculating is postponed by the computer server by a predetermined period of time;
   (i) determining if the checking account has sufficient funds to cover the aggregate savings amount;
   (j) if sufficient funds are available to cover the aggregate savings amount, debiting the aggregate savings amount from the checking account and crediting the aggregate savings amount in the savings account;
   (k) if insufficient funds are available to cover the aggregate savings amount, bypassing the debiting of the aggregate savings amount from the checking account and the crediting of the aggregate savings amount in the savings account, while still having performed at least one of the steps (e) and (g); and
   wherein computing load on the point of sale device is reduced because the calculation of the aggregate savings amount is deferred to the computer server.

2. The system of claim 1, wherein the crediting at least a part of the savings amount comprises:
   crediting a first percentage of the savings amount to the savings account; and
   crediting a second percentage of the savings amount to a second savings account.

3. The system of claim 1, wherein debiting the savings amount occurs on a daily basis and is based on an aggregate savings amount from a plurality of financial transactions.

4. The system of claim 1, wherein the savings amount is determined by rounding up a value of the financial transaction to a nearest predetermined value to calculate a rounded up amount, and the savings amount is equal to the rounded up amount.

5. The system of claim 1, wherein the computer server comprises memory storing computer-executable instructions that, when executed by the processor of the computer server, perform steps further comprising:
   crediting a matched amount to the savings account.

6. The system of claim 1, wherein the computer server comprises memory storing computer-executable instructions that, when executed by the processor of the computer server, perform steps further comprising:
   providing an identity of the second person to the first person as a source of the savings amount, wherein the first person and the second person are not a same person.

7. The system of claim 2, wherein the savings account belongs to the second person and the second savings account belongs to the first person.

8. The system of claim 2, wherein the first person and the second person are not a same person.

9. The system of claim 1, wherein the savings account is a government-recognized savings plan.

10. The system of claim 1, wherein the savings account is a charitable account.

11. The system of claim 1, wherein the computer server comprises memory storing computer-executable instructions that, when executed by the processor of the computer server, perform steps further comprising:
    generating a monthly statement including a summary of round up credits credited to the savings account.

12. The system of claim 5, wherein the computer server comprises memory storing computer-executable instructions that, when executed by the processor of the computer server, perform steps further comprising:
    determining whether a matching program is still in effect before crediting.

13. A method performed by a computer server communicatively coupled over a communication network with: a checking account associated with a customer capable of executing debit transactions, a savings account associated with the customer, and a communication interface adapted to receive financial transaction information from a point of sale device, the method comprising:
    (a) receiving at a financial institution, directly from the point of sale device communicating with the financial institution, information relating to a first base financial transaction associated with the checking account and relating to a transaction for at least one of goods and services between the customer and a merchant;
    (b) if the checking account has sufficient funds to cover the first base financial transaction, debiting the checking account by amount of the first base financial transaction;

(c) receiving at the financial institution information relating to a second base financial transaction associated with the checking account;
(d) if the checking account has sufficient funds to cover the second base financial transaction, debiting the checking account by amount of the second base financial transaction;
(e) periodically calculating at the financial institution an aggregate savings amount based at least on the first and the second base financial transactions, wherein the periodically calculating is postponed by the computer server by a predetermined period of time;
(f) determining if the checking account has sufficient funds to cover the aggregate savings amount;
(g) if sufficient funds are available to cover the aggregate savings amount, debiting the aggregate savings amount from the checking account and crediting the aggregate savings amount in the savings account; and
(h) if insufficient funds are available to cover the aggregate savings amount, bypassing the debiting of the aggregate savings amount from the checking account and the crediting of the aggregate savings amount in the savings account, while still having performed at least one of the steps (b) and (d);

wherein computing load on the point of sale device is reduced because the calculation of the aggregate savings amount is deferred to the computer server.

14. The method of claim 13, further comprising:
(i) periodically calculating a rewards amount; and
(j) crediting the rewards amount in the savings account, where the rewards amount is provided by the financial institution, and where the calculating the rewards amount is for a fixed period of time,
where calculating the rewards amount is based on a predetermined percentage of the aggregate savings amount for a fixed period of time.

15. The method of claim 13, wherein calculating the aggregate savings amount is based off a fixed amount of money for each base financial transaction.

16. The method of claim 13, wherein calculating the aggregate savings amount is based off of rounding up to a next dollar amount for each base financial transaction.

17. The method of claim 13 comprising, generating a monthly statement of the first and the second base financial transactions and the aggregate savings amounts debited for a month.

* * * * *